(12) United States Patent
Okamoto

(10) Patent No.: US 8,035,727 B2
(45) Date of Patent: Oct. 11, 2011

(54) IMAGE TAKING DEVICE WHICH DETERMINES WHETHER A TAKEN IMAGE IS BACKLIT AND CONTROLS EXPOSURE AND METHOD OF CONTROLLING EXPOSURE FOR THE SAME

(75) Inventor: Satoshi Okamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 928 days.

(21) Appl. No.: 11/984,166

(22) Filed: Nov. 14, 2007

(65) Prior Publication Data

US 2008/0111913 A1  May 15, 2008

(30) Foreign Application Priority Data

Nov. 15, 2006 (JP) ................................ 2006-309296

(51) Int. Cl.
G03B 7/00 (2006.01)
H04N 5/235 (2006.01)
(52) U.S. Cl. ....................................... 348/362
(58) Field of Classification Search .................. 348/362
See application file for complete search history.

(56) References Cited

U.S. PATENT DOCUMENTS

| 4,603,958 | A | * | 8/1986 | Maruyama et al. | 396/170 |
| 5,847,756 | A | * | 12/1998 | Iura et al. | 348/220.1 |
| 5,940,530 | A | * | 8/1999 | Fukushima et al. | 382/164 |
| 7,023,484 | B2 | * | 4/2006 | Watanabe | 348/364 |
| 7,847,859 | B2 | * | 12/2010 | Kobayashi | 348/371 |
| 2002/0012065 | A1 | * | 1/2002 | Watanabe | 348/364 |
| 2002/0018141 | A1 | * | 2/2002 | Takizawa | 348/362 |
| 2005/0036709 | A1 | | 2/2005 | Imai | |
| 2005/0207745 | A1 | | 9/2005 | Nonaka et al. | |
| 2007/0009245 | A1 | * | 1/2007 | Ito | 396/55 |

FOREIGN PATENT DOCUMENTS

| JP | 10-79888 A | 3/1998 |
| JP | 2001-249374 A | 9/2001 |
| JP | 2002-221747 A | 8/2002 |
| JP | 2004-235956 A | 8/2004 |

* cited by examiner

Primary Examiner — David Ometz
Assistant Examiner — Antoinette Spinks
(74) Attorney, Agent, or Firm — Birch, Stewart, Kolasch & Birch, LLP

(57) ABSTRACT

An aspect of the present invention provides an image taking device comprising an image pickup device which picks up an image in a field, a luminance measuring device which divides the image into the predetermined number of blocks to measure the luminance level of each block, a reference average luminance level calculating device which calculates an average luminance level in a predetermined reference area in the image, a bright block sampling device which compares the average luminance level in the reference area with the luminance level of each block to sample a bright block high in luminance level, a backlight determining device which determines whether the picked up image is backlit based on the average luminance level of the bright blocks and the average luminance level of the reference area, and an exposure controlling device which calculates an exposure value based on the result of the determination as to the backlight to control exposure.

20 Claims, 9 Drawing Sheets

IMAGE TAKING DEVICE WHICH DETERMINES WHETHER A TAKEN IMAGE IS BACKLIT AND CONTROLS EXPOSURE AND METHOD OF CONTROLLING EXPOSURE FOR THE SAME

BACKGROUND OF THE INVENTION

1. Field of the Invention

The present invention relates to an image taking device and a method of controlling exposure, and in particular, to a technique for controlling exposure at the time of picking up an image.

2. Description of the Related Art

Hitherto, there has been made a proposal that exposure is controlled with reference to the distribution of brightness in a screen (refer to Japanese Patent Application Laid-Open No. 2003-295251). In addition, Japanese Patent Application Laid-Open Nos. 2004-235956 and 2004-341901 disclose a technique in which picked up image is subjected to backlight correction processing.

The technique disclosed in Japanese Patent Application Laid-Open No. 2003-295251 is such that exposure is adjusted to one of a bright and a dark part in the screen. The technique, however, has a problem in that overexposure or underexposure is caused in the entire screen when the area of the bright or the dark part in the screen to which exposure is adjusted is smaller than that of the entire screen.

The technique disclosed in Japanese Patent Application Laid-Open Nos. 2004-235956 and 2004-34190 has such a problem that it lacks in scene toughness because, when a backlight state (a state where a background is brighter than a main object or a difference between contrasts in an image is large) is determined, and unless patterns do not match with each other, it is not determined that it is in a backlight state. Japanese Patent Application Laid-Open No. 2004-235956 describes that a luminance distribution histogram is formed. The process of the histogram is so complicated that it is caused a problem in that it is difficult to process the histogram in real time (for example, through image display).

The technique disclosed in Japanese Patent Application Laid-Open No. 2004-341901 is such that a determination is made based on a percentage of dark picture elements to bright picture elements whether or not a picked up image is a backlit figure image. The technique consumes much time in process for determining lightness on a picture element basis, which causes a problem in that it is difficult to process in real time. Japanese Patent Application Laid-Open No. 2004-341901 has also such a problem that it does not specifically describe an image process suited for a backlit figure image.

SUMMARY OF THE INVENTION

The present invention has been made in view of such a situation. It is an object of the present invention to provide an image taking device and a method of controlling exposure capable of determining a backlight state with a simple configuration, suppressing halation on a background which is liable to occur in a backlit scene and preventing an object from being darkening.

To solve the above problems, an image taking device according to a first aspect of the present invention comprises an image pickup device which picks up an image in a field; a luminance measuring device which divides the image into a predetermined number of blocks to measure a luminance level of each block; a reference average luminance level calculating device which calculates an average luminance level in a predetermined reference area in the image; a bright block sampling device which compares the average luminance level in the reference area with the luminance level of each block to sample a bright block high in luminance level; a backlight determining device which determines whether the picked up image is backlit based on the average luminance level of the bright block and the average luminance level of the reference area; and an exposure controlling device which calculates an exposure value based on the result of the determination as to the backlight to control exposure.

According to the first aspect, sampling bright blocks based on the luminance level of each block (for example, on the EV value) enables accurately determining whether the picked up image is backlit with a simple configuration.

According to a second aspect of the present invention, in an image taking device according to the first aspect, the bright block sampling device samples a block, as a bright block, in which a difference obtained by subtracting the average luminance level in the reference area from the luminance level of the blocks is greater than a first predetermined value.

According to a third aspect of the present invention, in an image taking device according to the first or second aspect, the bright block sampling device counts the number of the bright blocks, and the backlight determining device determines whether the picked up image is backlit based on the average luminance level of the bright blocks and the average luminance level of the reference area if the number of the bright blocks in the image is not less than a predetermined number, and determines whether the picked up image is backlit based on the average luminance level in the entire image or in an area except the reference area and the average luminance level of the reference area if the number of the bright blocks is less than the predetermined number.

According to a fourth aspect of the present invention, in an image taking device according to any one of the first to third aspects, the backlight determining device determines that the picked up image is backlit if a difference obtained by subtracting the average luminance level of the reference area from the average luminance level of the bright blocks is greater than a second predetermined value.

According to a fifth aspect of the present invention, in an image taking device according to any one of the first to fourth aspects, the backlight determining device determines that the picked up image is backlit if a difference obtained by subtracting the average luminance level of the reference area from the average luminance level in the entire image or in an area of except the reference area is greater than a third predetermined value.

According to the third to fifth aspects of the present invention, if the number of the bright blocks is great so that a backlight exerts a great influence, determining whether the picked up image is backlit based on the average luminance level of the bright blocks and the average luminance level of the reference area makes it easy to determine that the picked up image is backlit. On the other hand, if the number of bright blocks is small so that a backlight exerts a small influence, determining whether the picked up image is backlit based on the average luminance level in the entire image or in an area except the reference area and the average luminance level of the reference area makes it difficult to determine that the picked up image is backlit. Thus, performing an exposure correction if a backlight exerts a small influence prevents an object from being darkened.

An image taking device according to a sixth aspect of the present invention, in an image taking device according to any one of the first to fifth aspects, further comprises a flash device which emits a flash at the time of imaging to illuminate an object, wherein the exposure controlling device obtains an exposure value from the average luminance level of the bright blocks.

According to the sixth aspect, adjusting exposure to bright blocks based on the result of the determination as to backlight prevents halation, and illuminating an object with the flash device enables preventing the object from being darkened.

An image taking device according to a seventh aspect of the present invention, in an image taking device according to any one of the first to fifth aspects, further comprises an exposure correcting device which corrects the exposure value, wherein the bright block sampling device counts the number of the bright blocks and calculates an exposure value correction amount based on the average luminance level of the bright blocks, the average luminance level of the reference area and the number of the bright blocks if the backlight determining device determines that the picked up image is backlit to correct the exposure value based on the exposure value correction amount.

According to an eighth aspect of the present invention, in an image taking device according to the seventh aspect, the exposure value correcting device calculates an exposure value correction amount based on the number of the bright blocks to correct the exposure value if a difference obtained by subtracting the average luminance level in the reference area from the average luminance level of the bright blocks is greater than a fourth predetermined value and obtains an exposure value from the average luminance level of the bright blocks if a difference obtained by subtracting the average luminance level in the reference area from the average luminance level of the bright blocks is not greater than the fourth predetermined value.

According to the seventh and the eighth aspect of the present invention, if there is a great difference between the average luminance level of the bright blocks and the average luminance level in the reference area (for example, if background is bright), an imaging exposure is lowered to enable preventing halation of the image.

An image taking device according to a ninth aspect of the present invention, in an image taking device according to a first to fifth, seventh or eighth aspects, further comprises a flash device which emits a flash at the time of imaging to illuminate an object; and a diaphragm value calculating device which calculates such a diaphragm value that the flash device illuminates a predetermined range if the backlight determining device determines that the picked up image is backlit, wherein the exposure controlling device preferentially uses a diaphragm value closer to the open side than the calculated diaphragm value.

According to the ninth aspect, when a picked up image is backlit, a diaphragm value and shutter speed are controlled so that flash reaches a predetermined distance to enable preventing an object from being darkened.

According to a tenth aspect of the present invention, in an image taking device according to the ninth aspect, the exposure controlling device uses a diaphragm value narrower than the calculated diaphragm value if a shutter speed exceeds the upper value at which the accuracy of a shutter speed can be maintained when a diaphragm value is used which is closer to the open side than the calculated diaphragm value.

According to the tenth aspect, if a shutter speed is too fast to impair the accuracy of a mechanical shutter, the diaphragm is reduced to the minimum necessary to prevent the object from being darkened with the accuracy of shutter speed maintained.

An image taking device according to an eleventh aspect of the present invention, in an image taking device according to the ninth or tenth aspect, further comprises an object distance calculating device which calculates a distance to a main object, wherein the diaphragm value calculating device calculates such a diaphragm value that the flash device illuminates a range reaching the object distance.

According to the eleventh aspect, a diaphragm value and shutter speed are controlled so that flash reaches a main object to enable preventing the object from being darkened.

A method of controlling exposure according to a twelfth aspect of the present invention comprises the steps of: picking up an image in a field; dividing the image into the predetermined number of blocks to measure the luminance level of each block; calculating an average luminance level in a predetermined reference area in the image; comparing the average luminance level in the reference area with the luminance level of each block to sample a bright block high in luminance level; determining whether the picked up image is backlit based on the average luminance level of the bright blocks and the average luminance level of the reference area; and calculating an exposure value based on the result of the determination as to the backlight to control exposure.

According to a thirteenth aspect of the present invention, in a method of controlling exposure according to the twelfth aspect, the step of sampling a bright block samples a block, as a bright block, in which a difference obtained by subtracting the average luminance level in the reference area from the luminance level of the blocks is greater than a first predetermined value.

A method of controlling exposure according to a fourteenth aspect of the present invention, in a method of controlling exposure according to the twelfth or thirteenth aspect, further comprises the step of counting the number of the bright blocks, wherein the step of determining whether the picked up image is backlit determines whether the picked up image is backlit based on the average luminance level of the bright blocks and the average luminance level of the reference area if the number of the bright blocks in the image is not less than a predetermined number, and determines whether the picked up image is backlit based on the average luminance level in the entire image or in an area except the reference area and the average luminance level of the reference area if the number of the bright blocks is less than the predetermined number.

According to a fifteenth aspect of the present invention, in a method of controlling exposure according to any one of the twelfth to fourteenth aspects, the step of determining whether the picked up image is backlit determines that the picked up image is backlit if a difference obtained by subtracting the average luminance level of the reference area from the average luminance level of the bright blocks is greater than a second predetermined value.

According to a sixteenth aspect of the present invention, in a method of controlling exposure according to any one of the twelfth to fifteenth aspects, the step of determining whether the picked up image is backlit determines that the picked up image is backlit if a difference obtained by subtracting the average luminance level of the reference area from the average luminance level in the entire image or in an area of except the reference area is greater than a third predetermined value.

The method of controlling exposure according to a seventeenth aspect of the present invention, in a method of controlling exposure according to the twelfth to sixteenth aspects, further comprises the step of emitting a flash at the time of imaging to illuminate an object, wherein the step of controlling exposure obtains an exposure value from the average luminance level of the bright blocks.

The method of controlling exposure according to an eighteenth aspect of the present invention, in a method of controlling exposure according to any one of the twelfth to sixteenth aspects, further comprises the steps of: counting the number of the bright blocks; and calculating an exposure value correction amount based on the average luminance level of the bright blocks, the average luminance level of the reference area and the number of the bright blocks to correct the exposure value if the step of determining whether the picked up image is backlit determines that the picked up image is backlit.

According to a nineteenth aspect of the present invention, in a method of controlling exposure according to the eighteenth aspect, the step of correcting the exposure value calculates an exposure value correction amount based on the number of the bright blocks to correct the exposure value if a difference obtained by subtracting the average luminance level in the reference area from the average luminance level of the bright blocks is greater than a fourth predetermined value and obtains an exposure value from the average luminance level of the bright blocks if a difference obtained by subtracting the average luminance level in the reference area from the average luminance level of the bright blocks is not greater than the fourth predetermined value.

The method of controlling exposure according to a twentieth aspect of the present invention, in a method of controlling exposure according to any one of the twelfth to sixteenth, eighteenth or nineteenth aspects, further comprises the steps of: emitting a flash at the time of imaging to illuminate an object; and calculating such a diaphragm value that the step of emitting a flash illuminates a predetermined range if the step of determining whether the picked up image is backlit determines that the picked up image is backlit; wherein the step of controlling exposure preferentially uses a diaphragm value closer to the open side than the calculated diaphragm value.

According to a twenty-first aspect of the present invention, in a method of controlling exposure according to the twentieth aspect, the step of controlling exposure uses a diaphragm value narrower than the calculated diaphragm value if a shutter speed exceeds the upper value at which the accuracy of a shutter speed can be maintained when a diaphragm value is used which is closer to the open side than the calculated diaphragm value.

The method of controlling exposure according to a twenty-second aspect of the present invention, in a method of controlling exposure according to the twentieth or twenty-first aspect, further comprises the step of calculating distance to a main object, wherein the step of calculating a diaphragm value calculates such a diaphragm value that the step of emitting a flash illuminates a range reaching the object distance.

According to the present invention, it is enabled to accurately determine a backlight state with a simple configuration. It is also possible to prevent the halation of an image by lowering the image exposure if there is a large difference between average values of luminance level of bright blocks and luminance level of the entire screen and prevent an object from being darkened by controlling an diaphragm value and shutter speed so that flash reaches a predetermined distance.

DETAILED DESCRIPTION OF THE PREFERRED EMBODIMENTS

Preferred embodiments of an image taking device and a method of controlling exposure according to the present invention are described below with reference to the appended drawings.

[Configuration of the Image Taking Device]

Figure 1:
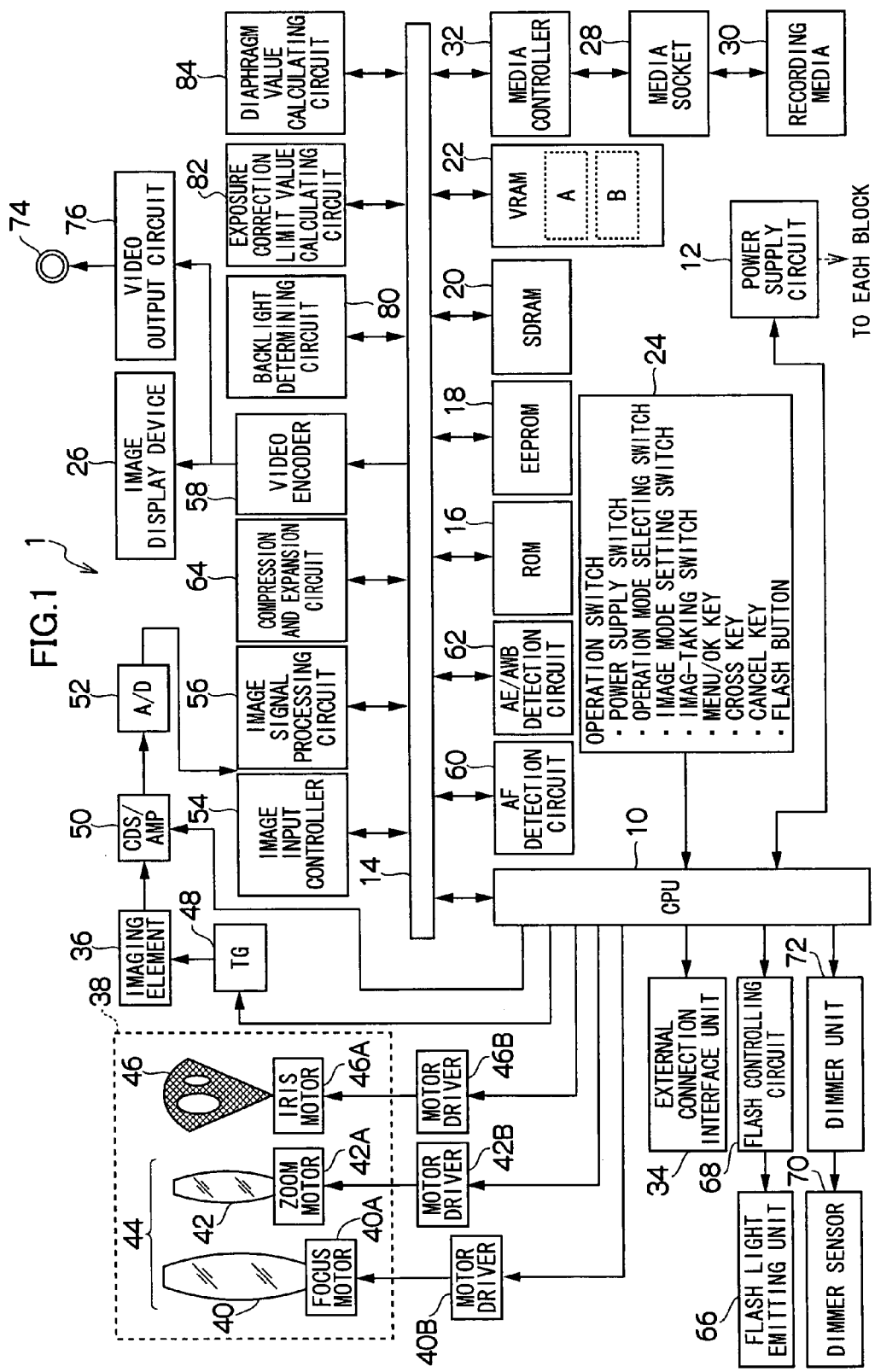
FIG. 1 is a block diagram illustrating a main configuration of the image taking device according to a first embodiment of the present invention.

FIG. 1 is a block diagram illustrating a main configuration of the image taking device according to a first embodiment of the present invention. An image taking device 1 illustrating in FIG. 1 is an electronic camera equipped with a function to record and reproduce a still and a moving image and totally controlled with a central processing unit (CPU) 10. The CPU 10 functions as a controlling device which controls the present camera system in accordance with a predetermined program and as a calculating device which performs various calculations such as automatic exposure (AE), automatic focus adjustment (AF) and white balance (WB) adjustment. A power supply circuit 12 is equipped with a power supply controlling unit and power supply battery to supply an operating power to each block of the camera system.

A read only memory (ROM) 16 and electronically erasable and programmable read only memory (EEPROM) 18 are connected to the CPU 10 through a bus 14. The ROM 16 stores programs executed by the CPU 10 and various data required for control. The EEPROM 18 stores picture element defect information of a charge coupled device (CCD) 36 and various constants/information related to the operation of the image taking device 1.

A synchronous dynamic random access memory (SDRAM) 20 is used as the development area of programs and a work area for calculation of the CPU 10 and as temporary storage area of image and speech data. A video random access memory (VRAM) 22 is a temporary storage memory dedicated to image data and includes areas A and B. The memory 20 and VRAM 22 may be commonly used.

The image taking device 1 is provided with operation switches 24 such as a power supply switch, operation mode selecting switch, image mode setting switch, image-taking switch, menu/OK key, cross key and cancel key. Signals from these various operation switches are input into the CPU 10. The CPU 10 controls the circuits of the image taking device 1 in accordance with the input signals, and performs, for example, lens driving control, image operation control, image processing control, image data recording/reproducing control and display control of an image display device 26.

The power supply switch is an operating device which turns on and off the power supply of the image taking device 1. The operation mode selecting switch is an operating device which switches operation modes between a still image mode in which a still image is picked up, moving image mode in which a moving image is picked up and reproduction mode in which a picked up image is reproduced. The image mode setting switch functions as a switch for switching the imaging mode of the image taking device 1. The imaging mode includes, for example, a scene position mode in which image is picked up with focus and exposure optimized according to scene position (for example, natural photo, figure, landscape, sports, night scene, underwater imaging, close-up (flower and the like), or text imaging), automatic mode in which focus or exposure is automatically set and manual mode in which focus or exposure is manually set or moving image imaging mode. The image-taking switch is a operating button whereby instructions for starting imaging are input and composed of a double stroke switch with a switch S1 which is turned on when it is half depressed and a switch S2 which is turned off when it is fully depressed. The menu/OK key is an operating key functioning both as a menu button commanding the image display device 26 to display a menu on its screen and as an OK button commanding decision and execution of selected contents. The cross key is an operating unit whereby instructions of four directions (upper, lower, left and right) are input and functions as a button (cursor move operation device), selects an item from a menu screen or instructs the selection of various set item from each menu. The upper and the lower key of the cross key function as a zoom switch at the time of imaging or as a reproduction zoom switch at the time of reproducing. The left and the right key function as a frame feed (forward- and reverse-direction feed) button in the reproduction mode. The cancel key is used when desired objects such as selected items are erased, instruction contents are cancelled or operation is returned to the preceding state. A flash button functions as a button which switches a flash mode. Depressing the flash button in the imaging mode sets the flash mode to each mode of flash light emission/prohibition.

An image display device 26 includes a liquid crystal monitor capable of displaying color images. The image display device 26 can be used as an electronic finder for confirming angle of view at the time of imaging and as a device for displaying recorded images. In addition, the image display device 26 is used as a display screen for user interface to display menu information and information such as selection items and set contents. Incidentally, other display devices such as an organic electro-luminescence (EL) and the like as well as a liquid crystal monitor may be used as the image display device 26.

The image taking device 1 has a media socket (media attachment unit) 28 to which a recording media 30 can be attached. The form of the recording media 30 is not limited in particular. Various media can be used as the recording media 30, such as a semiconductor memory card, small portable hard disk, magnetic disk, optical disk and magneto optical disk as typified by xD picture card (registered trade mark) and smart media (registered trade mark). A media controller 32 converts required signals to transfer input and output signals suited to the recording media 30 attached to the media socket 28.

The image taking device 1 is equipped with an external connection interface unit (external connection I/F) 34 as a communication device which connects the image taking device to a personal computer and other external apparatus. The connection of the image taking device 1 to an external apparatus using a USB cable (not shown) enables the image taking device 1 to transfer data with the external apparatus. The communication system between the image taking device 1 and an external apparatus is not limited to USB, but IEEE1394, Bluetooth (registered trade mark) or other communication systems may be used.

The imaging function of the image taking device 1 is described below. Selecting the imaging mode by the mode selecting switch causes a power source to be supplied to an imaging unit including an imaging element 36 (hereinafter referred to as CCD 36) to cause the imaging unit to be in an imaging mode. Incidentally, other imaging elements such as CMOS as well as CCD may be used as the imaging element 36.

A lens unit 38 is an optical unit composed of an imaging lens 44 including a focus lens 40 and zoom lens 42 and a mechanical shutter 46 used also as a diaphragm. The imaging lens 44 is focused by moving the focus lens 40 with a focus motor 40A and zoomed by moving the zoom lens 42 with a zoom motor 42A. The focus motor 40A and zoom motor 42A are driven and controlled by a focus motor driver 40B and zoom motor driver 42B respectively. The CPU 10 outputs control signals to the focus motor driver 40B and zoom motor driver 42B.

The diaphragm 46 is formed of a so-called turret diaphragm and changes a diaphragm value (F number) by rotating a perforated turret plate with aperture values of F2.8 to F8. The diaphragm 46 is driven by an iris motor 46A. The iris motor 46A is driven and controlled by an iris motor driver 46B. The CPU 10 outputs a control signal to the iris motor driver 46B.

Light passing through the lens unit 38 is imaged on the light receiving surface of the CCD 36. A large number of photo detectors (for example, photo diodes) is two-dimensionally arranged on the light receiving surface of the CCD 36. Red (R), green (G) and blue (B) primary color filters are arranged corresponding to the photo detectors at a predetermined configuration. The CCD 36 has an electronic shutter function to control the charge storing time (shutter speed) of the photo detectors. The CPU 10 controls the charge storing time of the CCD 36 through a timing generator (TG) 48. The CPU 10 controls the electric potential on the overflow drain (OFD) of the CCD 36 to adjust the upper limit value of signal charge stored in photo detectors forming the CCD 36.

An image of an object imaged on the light receiving surface of the CCD 36 is converted to a signal charge whose amount correspond to an amount of light received by the photo detectors. The signal charge stored in the photo detectors is sequentially read out as an analog voltage signal according to the signal charge based upon driving pulses such as read-out pulse, vertical synchronizing signal, horizontal synchronizing signal, vertical drive signal and horizontal drive signal provided by the TG 48 in accordance with the command of the CPU 10.

The analog voltage signal read out from the CCD 36 is sent to an analog processing unit (CDS/AMP) 50 and the R, G and B signals in each pixel are sampled and held (correlative double sampling process), amplified and then applied to an A/D converter 52. Dot sequential R, G and B signals converted into digital signals by the A/D converter 52 are stored in the memory 20 through an image input controller 54. The amplifying gain of the R, G and B signals in the analog processing unit 50 corresponds to an imaging sensitivity (ISO sensitivity). The CPU 10 adjusts the amplifying gain to set the imaging sensitivity.

An image signal processing circuit 56 functions as an image processing device including a synchronizing circuit (a processing circuit in which the spatial deviation of a chrominance signal caused by a color filter arrangement of a single board CCD is interpolated to synchronously convert the chrominance signal), white balance adjusting circuit, gradation conversion processing circuit (for example, gamma correction circuit), contour correction circuit and luminance and color-difference signal generating circuit and subjects the R, G and B signals stored in the memory 20 to a predetermined signal processing while utilizing the memory 20 in accordance with the command of the CPU 10.

The R, G and B signals input into the image signal processing circuit 56 are converted to a luminance signal (Y signal) and color-difference signal (Cr and Cb signals) and subjected to a predetermined processing such as gradation conversion processing (for example, gamma correction) therein. The image data processed by the image signal processing circuit 56 is stored in the VRAM 22.

When a picked up image is output to an image display device 26 to monitor the image, the image data is read out from the VRAM 22 and sent to a video encoder 58 through the bus 14. The video encoder 58 converts the input image data to a video signal for display based on a predetermined system (for example, NTSC color composite video signal) and outputs the converted video signal to the image display device 26.

The image signal output from the CCD 36 alternately rewrites image data expressing one frame of an image in the areas A and B of the VRAM 22. An image data to be written is read out from an area, where data is not being rewritten, out of the areas A and B of the VRAM 22. The image data in the VRAM 22 is thus periodically rewritten and an image signal generated from the image data is supplied to the image display device 26 to display a live view image on the image display device 26 in real time. An operator can confirm an angle of view through a live view image (through image) displayed on the image display device 26.

Half depressing the image-taking switch to turn on the switch S1 causes the image taking device 1 to start an automatic exposure (AE) and an automatic focus (AF) processing. The image signal output from the CCD 36 is converted to a digital signal and then input into an AF detecting circuit 60 and AE/AWB detecting circuit 62 through the image input controller 54.

The AE/AWB detecting circuit 62 performs AE processing based on the image signal output from the CCD 36. The AE processing is described later in detail.

The AE/AWB detecting circuit 62 calculates an average integrated value for each color of the R, G and B signals on a divided area basis and provides the CPU 10 with the calculated result at the time of automatic white balance adjustment. The CPU 10 obtains integrated values of the R, G and B signals, finds the ratios of R/G and B/G on the divided area basis, determines the kind of a light source based upon the distribution of values of R/G and B/G in the color space of R/G and B/G axis coordinates and controls the gain value (white balance gain) of the R, G and B signals in a white balance adjusting circuit according to the determined kind of the light source to correct signals of each color channel.

The automatic focus (AF) in the image taking device 1 uses, for example, a contrast AF in which the focus lens 40 is moved so as to maximize the high frequency components of the G signal in the image signal. That is to say, the AF detecting circuit 60 includes a high-pass filter for passing only high frequency components of the G signal, absolute-value acquiring process unit, AF area sampling unit for segmenting signals in an area subjected to focus and predetermined in a screen (for example, in the center part of the screen) and integrating unit for integrating absolute-value data in the AF area.

Data of the integrated value obtained by the AF detecting circuit 60 is transferred to the CPU 10. The CPU 10 calculates a focus appraisal value (AF appraisal value) in a plurality of AF detecting points (focus position) while controlling the focus motor driver 40B to move the focus lens 40 and takes a lens position as a focal position, where the calculated focus appraisal value becomes maximal. The CPU 10 controls the focus motor driver 40B to move the focus lens 40 to the obtained focal position. Incidentally, the luminance signal (Y signal) as well as the G signal, may be used to calculate the AF appraisal value.

Half depressing the image-taking switch to turn on the switch S1 performs the AE/AF processing. Fully depressing the image-taking switch to turn on the switch S2 starts an imaging operation for recording. The image data obtained in response to the S2 turning on is converted to the luminance/color-difference signal (Y/C signal) in the image signal processing circuit 56, subjected to a predetermined processing such as gamma correction and then stored in the memory 20.

The Y/C signal stored in the memory 20 is compressed by a compression and expansion circuit 64 in accordance with a prescribed format, and thereafter, recorded on the recording media 30 through the media controller 32. For instance, a still image is recorded as an image file in the joint photographic experts group (JPEG) format and a moving image is recorded as an image file in the audio Video Interleaving (AVI) format.

When a flash mode is set to the flash light emission mode, the CPU 10 issues a command to a flash controlling circuit 68 to operate it. The flash controlling circuit 68 includes a main capacitor for supplying current to a flash light emitting unit (discharge tube) 68 to emit it and performs a control of charging the main capacitor and a control of timing of charging (light emitting) of the flash light emitting unit 66 and charging time in accordance with a command of the flash light emission from the CPU 10. Incidentally, a light emitting diode (LED) may be used as a flash light emitting device instead of the discharge tube.

A dimmer sensor 70 receives flash light reflected by an object and converts the light into an electric current. The photo electric current obtained by the photoelectric conversion of the dimmer sensor 70 is charged into a capacitor included in a dimmer unit 72. The dimmer unit 72 monitors a charging state in the capacitor. When the dimmer unit 72 determines that the capacitor is charged to a prescribed amount of electric charge, the dimmer unit 72 issues a command of stopping light emission to the flash light emitting unit 66. The flash light emitting unit 66 stops supplying electric power to the discharge tube in accordance with the command of stopping light emission from the dimmer unit 72 to stop emit light.

When the mode selecting switch selects a reproduction mode, compressed data of the latest image file (an image file recorded latest) recorded on the recording media 30 are read out. If an image file related to the latest record is a still image file, the read-out image compressed data is expanded into a decompressed Y/C signal through the compression and expansion circuit 64 and converted into a displaying signal through the image signal processing circuit 56 and video encoder 58 and then output to the image display device 26. Thus, image contents in the image file are displayed on the screen of the image display device 26.

Operating the right or the left key of the cross key during the reproduction of one frame of a still image (including during the reproduction of a start frame of a moving image) enables the image file to be reproduced to be switched (forward frame feed/reverse frame feed). The image file in a frame-feed position is read out from the recording media 30 and a still or moving image is reproduced and displayed on the image display device 26 as is the case with the above.

When an external display such as a personal computer or television receiver is connected to the image taking device 1 through a video input output terminal 74 in the reproduction mode, the image files recorded in the recording media 30 are processed by a video output circuit 76, reproduced and displayed on the external display.

[Exposure Control Method]

The method of controlling exposure according to the present invention is described below. As stated above, the image signal output from the CCD 36 is converted into a digital signal and then input into the AE/AWB detecting circuit 62 through the image input controller 54.

Figure 2:
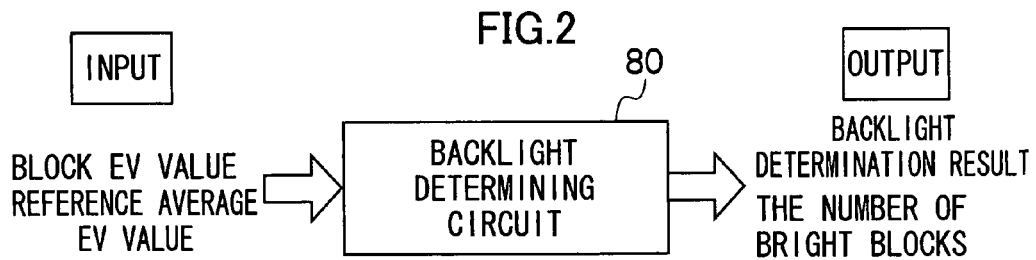
FIG. 2 is a block diagram illustrating the input and output of a backlight determining circuit 80.

The AE/AWB detecting circuit 62 includes an integrating circuit which divides one screen into blocks (for example, 16×16 blocks BL [i] (i=0, . . . , 255)) each having a predetermined area and integrates the R, G and B signals for each block and provides the CPU 10 with the values integrated by the integrating circuit. The CPU 10 detects the brightness in a field (field luminance) based on the integrated value obtained from the AE/AWB detecting circuit 62. The CPU 10 calculates an exposure value of each block (block EV value) EV [i] (i=0, . . . , 255) and an average EV value in a reference area in the image (reference average EV value) and inputs the block EV value and reference average EV value into a backlight determining circuit 80 as illustrated in FIG. 2.

The reference area refers to an area formed of, for example, one or a plurality of blocks (for example, four blocks) in the center of an image, an area formed of one or a plurality of blocks (for example, three blocks) which is away by a distance of one fourth of the width of the image from the right end of the image or an area including a specific object detected by the detecting process of an object (for instance, a face of a figure).

The average EV value of the reference area is calculated by the following equation (1). Where, BL [i] (i=0, . . . , n) is a block in the reference area, "n" is the number of blocks in the reference area and EV [i] (i=0, . . . , n) is the EV value of block in the reference area.

[Formula 1]

$$(\text{Reference average } EV \text{ value}) = \log_2 \frac{\sum_{i=1}^{n} 2^{EV[i]}}{n} \quad (1)$$

Figure 3:
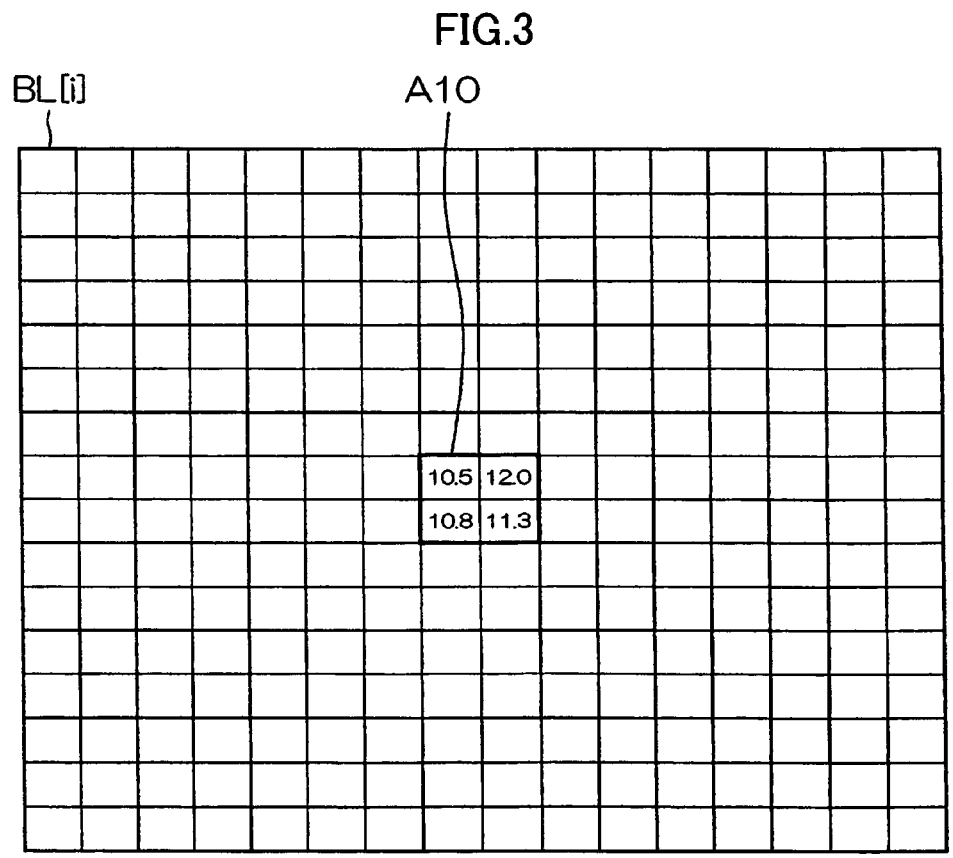
FIG. 3 is a block diagram illustrating an example of a reference area.

For example, as illustrated in FIG. 3, if a reference area A10 is formed of four blocks at the center of the image and the EV values of each block are 10.5 EV, 12.0 EV, 10.8 EV and 11.3 EV, the reference average EV value is calculated by the following equation (2).

[Formula 2]

$$\left(\begin{array}{c}\text{Reference average} \\ EV \text{ value}\end{array}\right) = \log_2 \frac{2^{10.5} + 2^{12.0} + 2^{10.8} + 2^{11.3}}{4} \quad (2)$$
$$= 11.265$$

The backlight determining circuit 80 detects bright blocks in the image based on the block EV value and reference average EV value input from the CPU 10 and determines whether the image are backlit (backlight determination). As illustrated in FIG. 2, the backlight determining circuit 80 outputs the result of determination as to backlight to an exposure correction limit value calculating circuit 82. The backlight determining circuit 80 outputs the number of the bright blocks to the exposure correction limit value calculating circuit 82.

Figure 4:
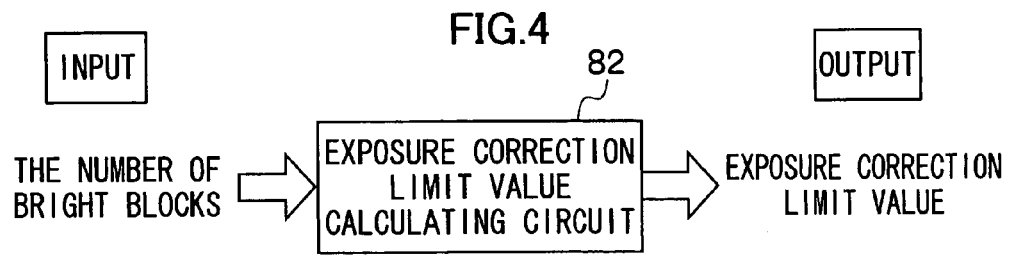
FIG. 4 is a block diagram illustrating the input and output of an exposure correction limit value calculating circuit 82.

As illustrated in FIG. 4, the exposure correction limit value calculating circuit 82 calculates an exposure correction limit value for correcting an imaging exposure value based upon the result of determination as to backlight and the number of the bright blocks input from the backlight determining circuit 80 and outputs the value to the CPU 10. The CPU 10 calculates a normal exposure value with the block EV value EV [i] of each block provided with a predetermined weighting and calculates an imaging exposure value based on the exposure correction limit value input from the exposure correction limit value calculating circuit 82 and the normal exposure value.

Figure 5:
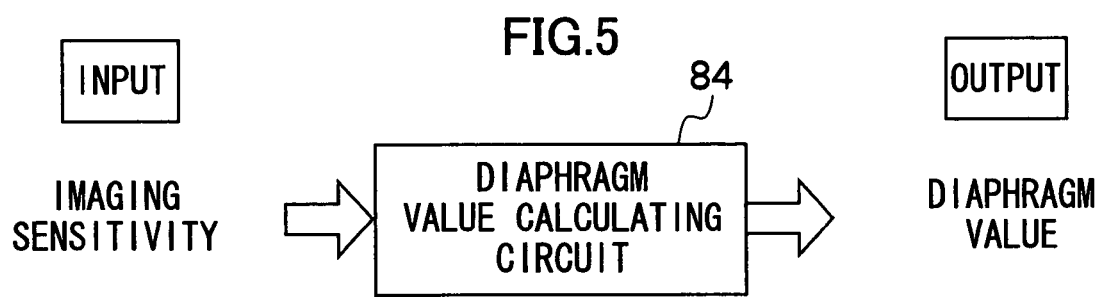
FIG. 5 a block diagram illustrating the input and output of a diaphragm value calculating circuit 84.

As illustrated in FIG. 5, a diaphragm value calculating circuit 84 determines a provisional diaphragm value based on the imaging sensitivity input from the CPU 10 so that a flash reaches a predetermined distance and outputs the value to the CPU 10. The CPU 10 determines a diaphragm value and shutter speed according to the calculated imaging exposure value and a prescribed programming diagram so that a flash reaches a predetermined distance and controls the electronic shutter of the imaging element 36 and the mechanical shutter 46 used also as the diaphragm to obtain an appropriate exposure amount.

In the present embodiment, the luminance level of each block is represented by an EV value, however, it may be represented by other values such as luminance value.

Figure 6:
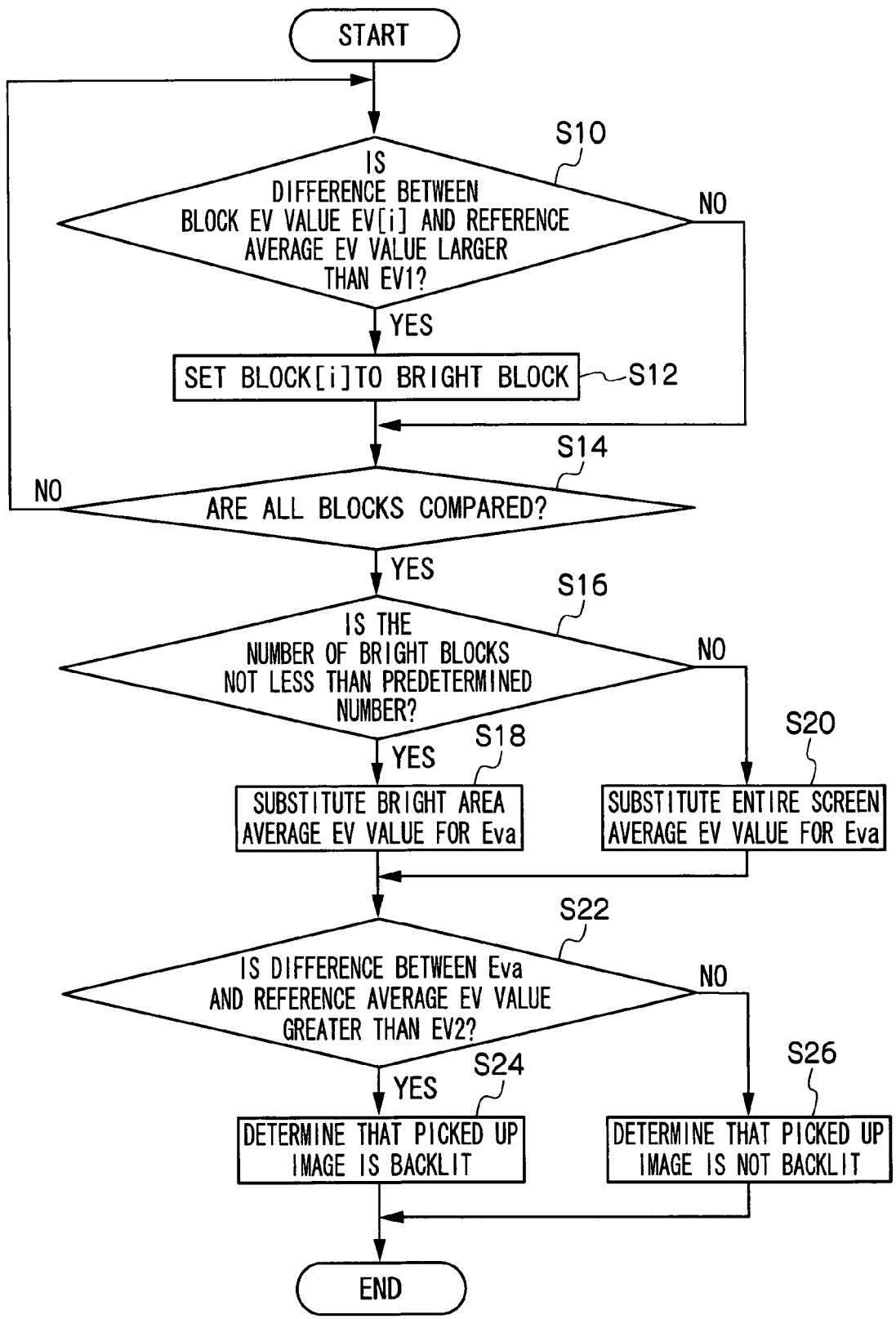
FIG. 6 is a flow chart illustrating a process for determining backlight in the method of controlling exposure according to the first embodiment of the present invention.
Figure 7:
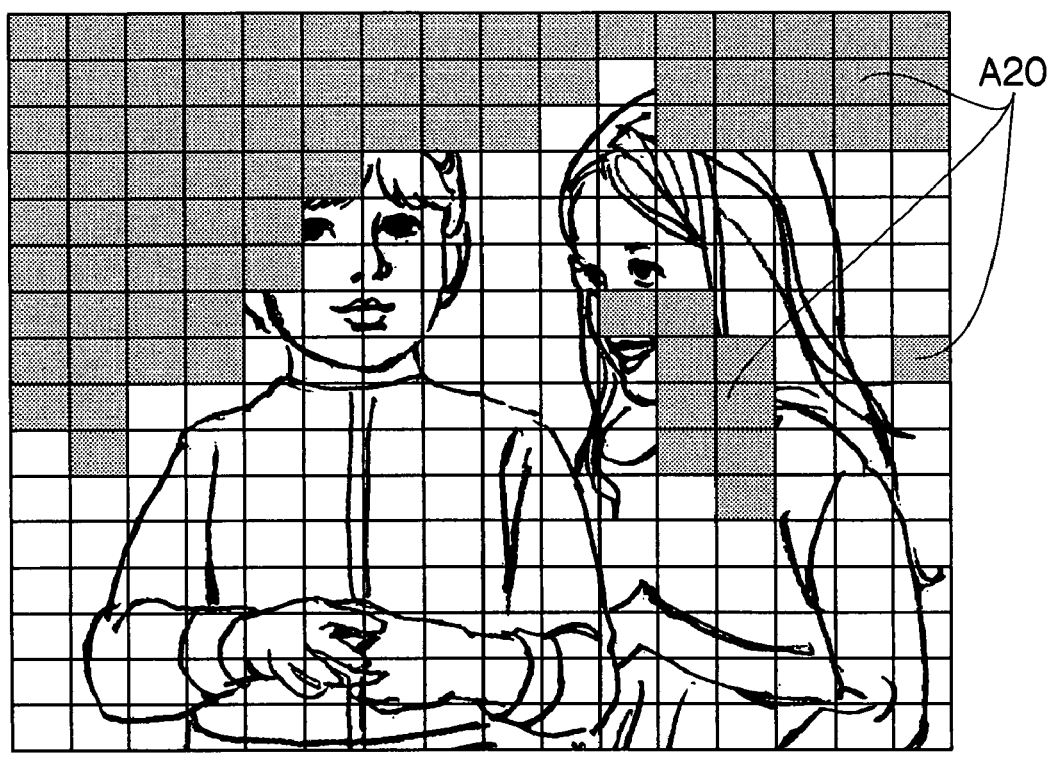
FIG. 7 is a photo showing an example of a bright area.

FIG. 6 is a flow chart illustrating a process for determining backlight in the method of controlling exposure according to a first embodiment of the present invention. When the CPU 10 inputs a block EV value and reference average EV value, a determination is made as to whether a difference between the block EV value EV [i] (i=j) and the reference average EV value, (i.e., EV [i]–the reference average EV value), is larger than a bright block determination EV value EV1 (e.g., EV1=1.0 EV) (Step S10). If the difference between the block EV value EV [i] (i=0) and the reference average EV value is larger than the bright block determination EV value EV1 (Yes, at step S110), the block "i" (i=0) is set to a bright block [i] (step S12). The processes steps S10 to S14 are repeated. When a determination as to whether a block is a bright for all the blocks is finished (Yes, at step S14), an aggregation of blight blocks (bright area A20) in the image is detected as illustrated in FIG. 7.

In the next place, a determination is made as to whether the number of the bright blocks is not less than a predetermined number (step S16). Where, the predetermined number is, for example, a half of all the blocks (i.e., 128 blocks). If the number of the bright blocks is not less than the predetermined number (Yes, at step S116), the average value of EV values in the bright blocks (bright area average EV value) is calculated and substituted for a parameter Eva (step S18). If the number of the bright blocks is less than the predetermined number (No, at step S16), the average value of EV values in all the blocks (entire screen average EV value) is calculated and substituted for the parameter Eva (step S20). The entire screen average EV value is calculated by the following equation (3).

[Formula 3]

$$(\text{Entire screen average } EV \text{ value}) = \log_2 \frac{\sum_{i=0}^{255} 2^{EV[i]}}{n} \quad (3)$$

Incidentally, the average EV value of the blocks except the reference area may be used instead of the entire screen average EV value at step S20.

A determination is made as to whether a difference between the parameter Eva and the reference average EV value (i.e., Eva−the reference average EV value), is greater than a backlight determination EV value EV2 (e.g., EV2=1.5 EV) (step S22). If the difference between the parameter Eva and the reference average EV value is larger than the backlight determination EV value EV2 (Yes, at step S22), it is determined that the picked up image is "backlit" (step S24). On the other hand, if the difference between the parameter Eva and the reference average EV value is not greater than the backlight determination EV value EV2 (No, at step S22), it is determined that the picked up image is not "backlit" (step S26). Thus, a determination is made as to whether the picked up image is "backlit" or not. The result of determination as to backlight and the number of the bright blocks are output to the exposure correction limit value calculating circuit 82.

Figure 8:
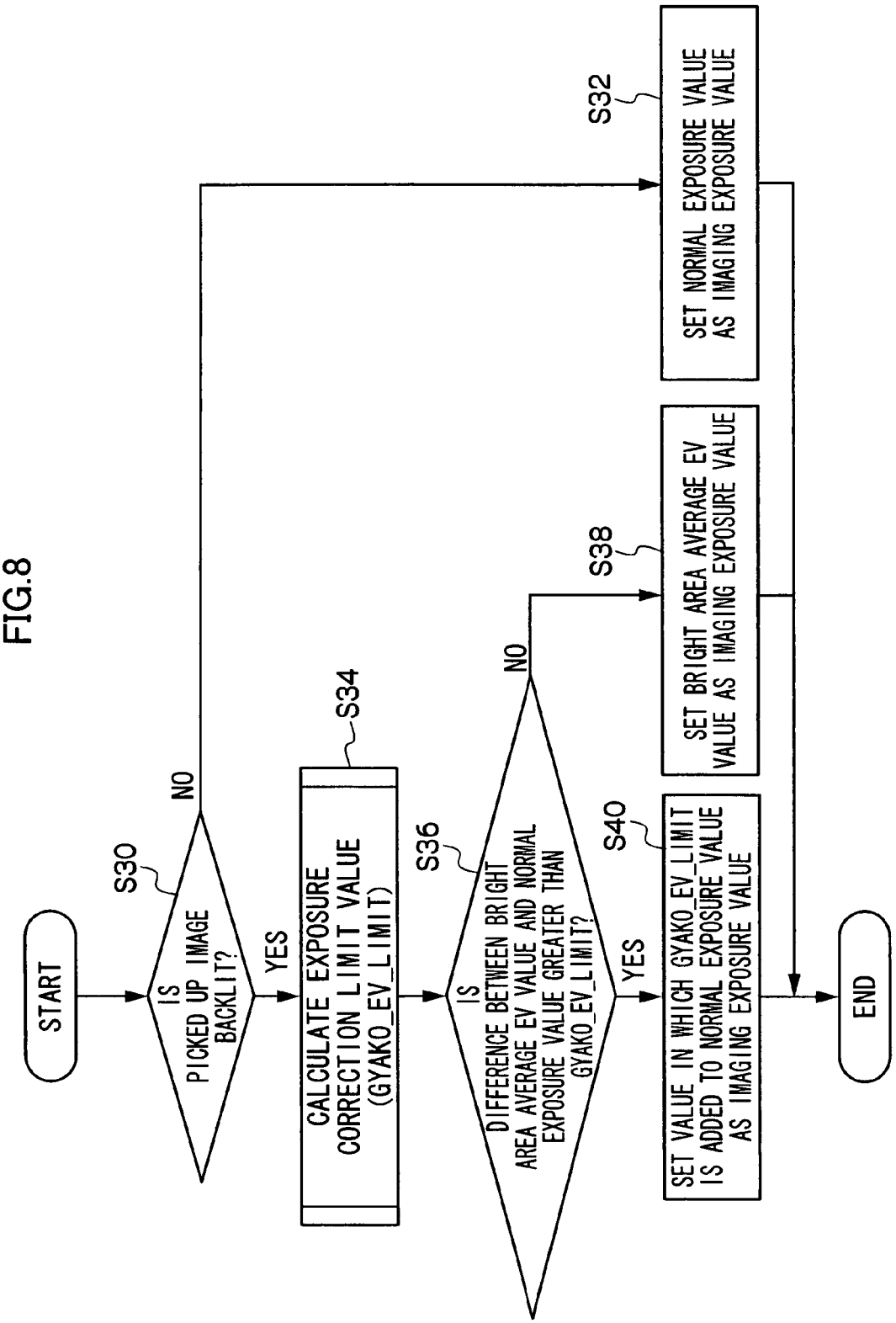
FIG. 8 is a flow chart illustrating a process for calculating imaging exposure value.

FIG. 8 is a flow chart illustrating a process for calculating imaging exposure value. If it is determined that the picked up image is resultantly not "backlit" (No, at step S30), the normal exposure value calculated by the CPU 10 is set as an imaging exposure value (step S32).

Figure 9:
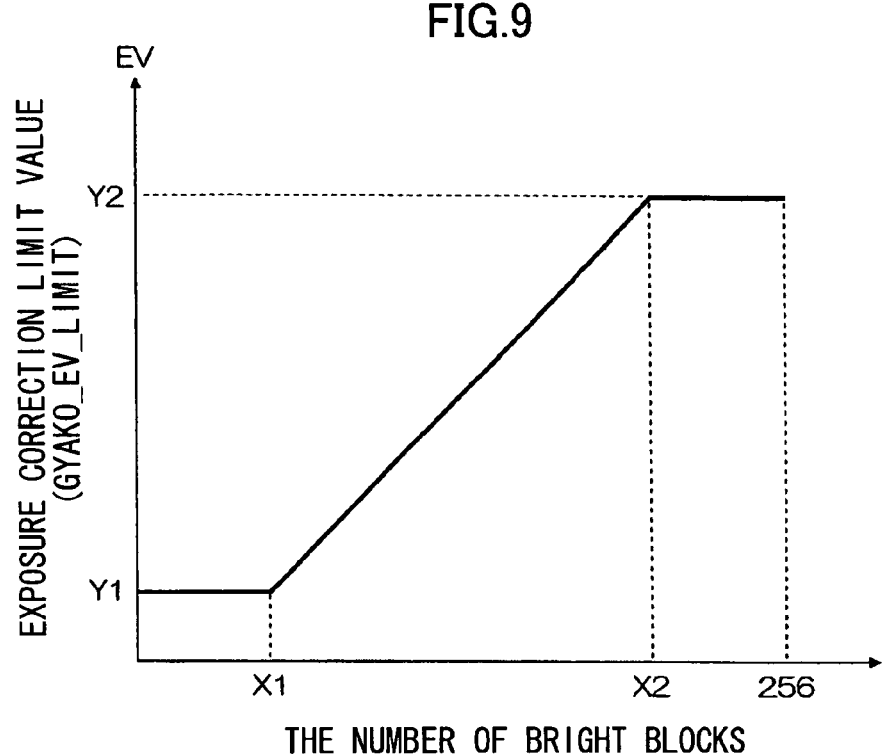
FIG. 9 is a graph illustrating a membership function for calculating an exposure correction limit value GYAKO_EV_LIMIT.

If it is determined that the picked up image is resultantly "backlit" (Yes, at step S30), an exposure correction limit value GYAKO_EV_LIMIT is calculated (step S34). The exposure correction limit value GYAKO_EV_LIMIT calculated at step S34 is output to the CPU 10. FIG. 9 is a graph showing a membership function for calculating the exposure correction limit value GYAKO_EV_LIMIT. The exposure correction limit value GYAKO_EV_LIMIT is calculated based on the number of the bright blocks input from the backlight determining circuit 80 and the membership function shown in FIG. 9. The parameters X1, X2, Y1 and Y2 shown in FIG. 9 are, for example, X1=15, X2=230, Y1=0.3 and Y2=2.0.

The average EV value of the blocks in the bright area (bright area average EV value) is calculated in the CPU 10. A determination is made as to whether a difference between the bright area average EV value and the normal exposure value is greater than the exposure correction limit value GYAKO_EV_LIMIT (step S36). If the difference between the bright area average EV value and the normal exposure value is not greater than the exposure correction limit value GYAKO_EV_LIMIT (No, at step S36), the bright area average EV value is set as an imaging exposure value (step S38). On the other hand, if the difference between the bright area average EV value and the normal exposure value is greater than the exposure correction limit value GYAKO_EV_LIMIT (Yes, at step S36), a value in which the exposure correction limit value GYAKO_EV_LIMIT is added to the normal exposure value is set as an imaging exposure value (step S40). Thereby, the imaging exposure value is calculated and output to the CPU 10.

That is to say, if the difference between the bright area average EV value and the normal exposure value is greater (for example, if the background is a bright sky), the imaging exposure value is lowered to enable preventing halation in the image.

Figure 10:
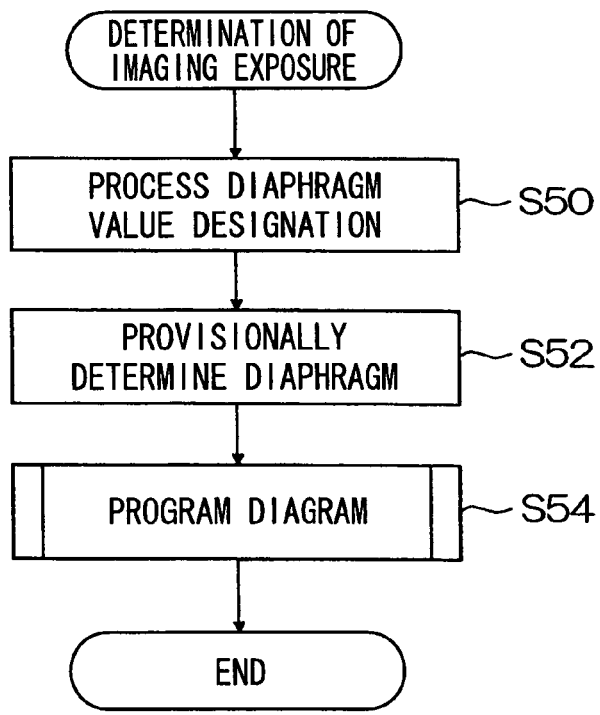
FIG. 10 is a flow chart illustrating a process for calculating a diaphragm value and shutter speed.

FIG. 10 is a flow chart illustrating a process for calculating a diaphragm value and shutter speed (imaging exposure determining process). At first, a process is performed for designating a diaphragm value (step S50). In general, if an imaging exposure value is lowered to prevent halation, a flash cannot reach a main object. Since a distance over which a flash reaches depends on a diaphragm value (diaphragm diameter) and imaging sensitivity, the diaphragm value is controlled according to a preset distance over which a flash reaches and the imaging sensitivity input from the CPU 10. Specifically, if the imaging sensitivity is taken to be ISO 100, a diaphragm value (diaphragm diameter) FNo is expressed by the following equation (4).

$$GNo = FNo \times L \quad (4)$$

Where, GNo is a constant showing a range, in which a flash reaches, defined for each model of an image taking device and L is a distance over which a flash reaches. The distance L over which a flash reaches is set according to, for example, an imaging mode (figure mode and landscape mode). For example, if an imaging sensitivity is ISO 100, GNo=5.1 and L=2 m in a backlit daylight synchronous scene, the diaphragm value FNo can be obtained from the following equation.

$$FNo = 5.1/2 = 2.55$$

That is to say, if the diaphragm value is set to 2.55 or smaller (or 2.55 to a diaphragm diameter larger than 2.55), a flash is enabled to reach up to 2 m. For this reason, the diaphragm value is increased by $2^{1/2}$ according as an imaging sensitivity is increased by 100 from ISO 100 (ISV). Consequently, if an imaging sensitivity is ISO 200, FNo can be expressed by the following equation.

$$FNo = 2.55 \times 2^{1/2} = 3.60$$

In other words, if a diaphragm value is set to 3.6 or smaller (or 3.60 to a diaphragm diameter larger than 3.60), a flash is enabled to reach up to 2 m.

The diaphragm value calculated at step S50 is determined as a provisional value (provisional determination) (step S52) and output to the CPU 10. The CPU 10 determines the diaphragm value and shutter speed based on the imaging exposure value and the program diagram mentioned below (step S54). The electronic shutter of the imaging element 36 and the mechanical shutter 46 used also as an diaphragm are controlled according to the diaphragm value and shutter speed determined based on the program diagram to provide an appropriate exposure amount.

Figure 11:
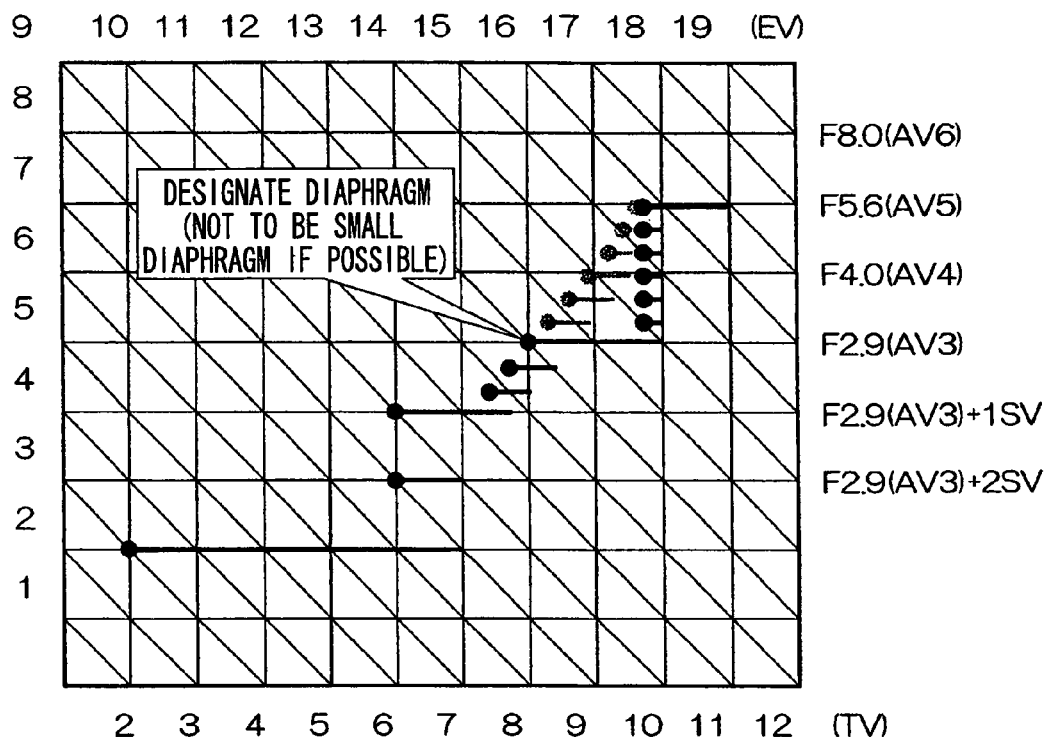
FIG. 11 is a program diagram according to the first embodiment of the present invention.

FIG. 11 is a program diagram according to the present embodiment. As shown in the black solid lines, in the present embodiment, a diaphragm diameter not smaller than the diaphragm value provisionally determined at step S52 is used to increase the shutter speed according to the imaging exposure value. When the shutter speed is faster than a threshold, the diaphragm value is shifted to a darker side not to be a small aperture if possible. The threshold of the shutter speed is the fastest within the range in which the accuracy of the mechanical shutter 46 can be maintained. This allows the flash to surely illuminate a main object even if the imaging exposure value is lowered.

The program diagram is such that the diaphragm value and shutter speed are varied according to imaging purposes such as setting imaging modes (for example, a high speed shutter is preferentially used or a lens smaller in a diaphragm diameter is preferentially used). For this reason, in the present embodiment, a diaphragm value on a small diaphragm side is preferably used as a provisionally determined diaphragm value within the range in which a flash reaches the distance L so that the purpose of the program diagram is not lost.

According to the present embodiment, it is enabled to accurately determine backlight with a simple configuration. When a difference between the bright area average EV value and the normal exposure value is greater, the imaging exposure value is lowered to enable preventing halation in an image and an object from being darkened by controlling the diaphragm value and the shutter speed so that a flash reaches a predetermined distance.

Second Embodiment

The second embodiment of the present invention is described below. The backlight determining process and the correction process for an imaging exposure value are the same as those in the above embodiment.

Figure 12:
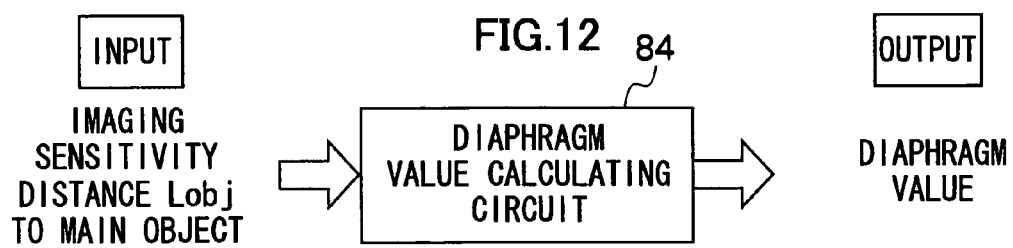
FIG. 12 is a block diagram illustrating the input and output of a diaphragm value calculating circuit 84 according to a second embodiment of the present invention.

FIG. 12 is a block diagram illustrating the input and output of the diaphragm value calculating circuit 84 according to the present embodiment. The CPU 10 calculates a distance (object distance) Lobj to a main object based on the focus appraisal value calculated by the AF detecting circuit 60 and inputs the calculated distance to the diaphragm value calculating circuit 84. The diaphragm value calculating circuit 84 provisionally determines a diaphragm value based on the object distance Lobj and imaging sensitivity input from the CPU 10 and outputs the diaphragm value to the CPU 10. If an imaging sensitivity is ISO 100, the provisional determining value of the diaphragm value FNo is expressed by the following equation (5).

$$GNo = FNo \times Lobj \qquad (5)$$

The diaphragm value FNo may be increased by $2^{1/2}$ according as an imaging sensitivity is increased by 100 from ISO 100.

The CPU 10 determines a diaphragm value and shutter speed based on the imaging exposure value and the program diagram illustrated in FIG. 11 to perform AE control.

Figure 13:
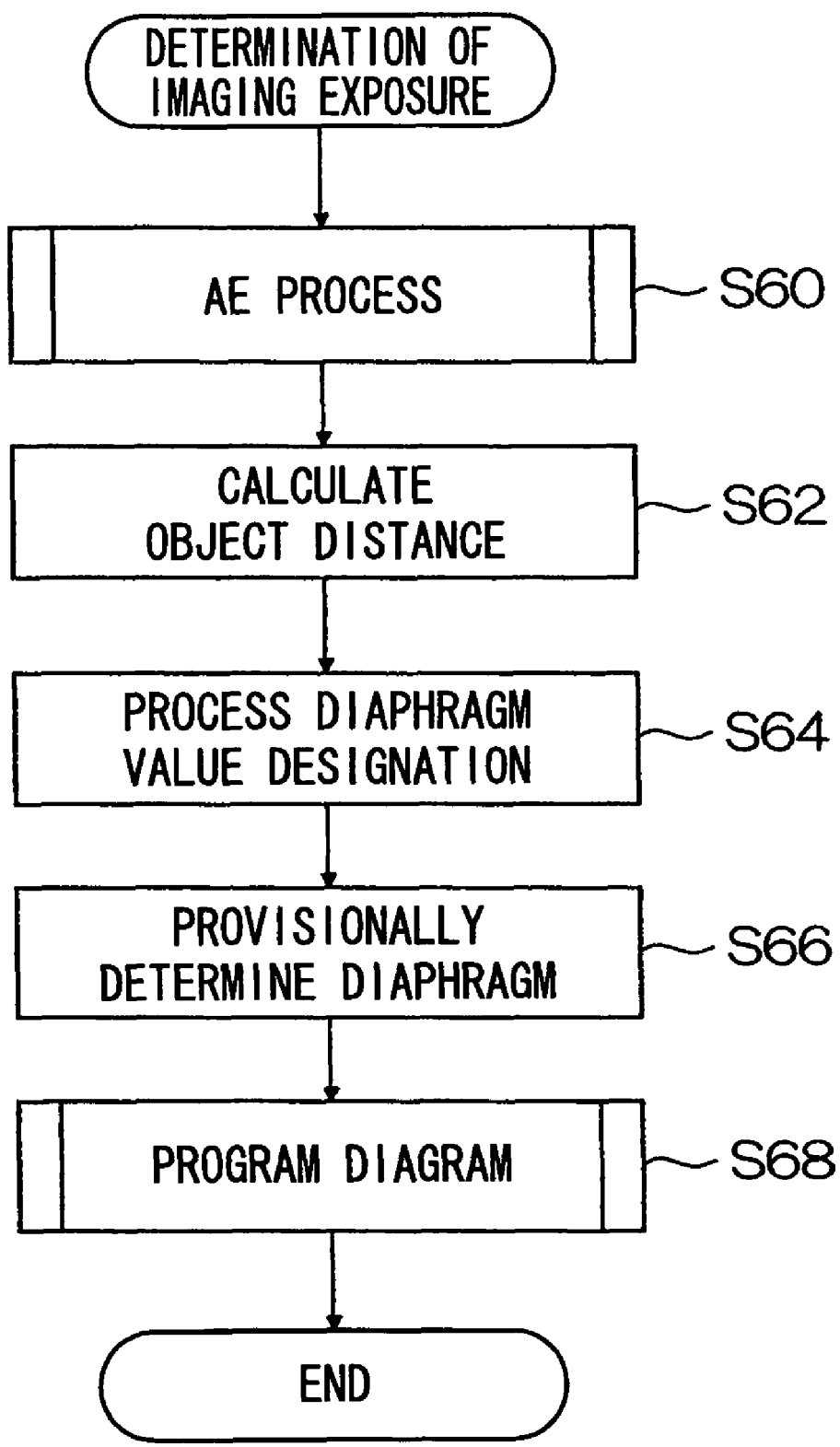
FIG. 13 is a flow chart illustrating a process for calculating a diaphragm value and shutter speed according to the second embodiment of the present invention.

FIG. 13 is a flow chart illustrating a process for calculating a diaphragm value and shutter speed (imaging exposure determining process) according to the present embodiment. An AF process is conducted (step S60) and an object distance Lobj is calculated (step S62). A diaphragm value is calculated and provisionally determined based on the object distance Lobj and the imaging sensitivity (step S64 and S66) to output the value to the CPU 10. The CPU 10 determines a diaphragm value and shutter speed based on the imaging exposure value and the program diagram illustrated in FIG. 11 (step S68).

According to the present embodiment, a distance to a main object is calculated, and a diaphragm value and shutter speed are controlled so that a flash reaches to the main object, thereby enabling surely preventing the object from being darkened.

What is claimed is:

1. An image taking device comprising:
an image pickup device which picks up an image in a field;
a luminance measuring device which divides the image into a predetermined number of blocks to measure a luminance level of each block;
a reference average luminance level calculating device which calculates an average luminance level in a predetermined reference area in the image;
a backlight determining device which compares the average luminance level in the reference area with the luminance level of each block to sample a bright block high in luminance level, and determines whether the picked up image is backlit based on the average luminance level of the bright block and the average luminance level of the reference area;
an exposure controlling device which calculates an exposure value based on the result of the determination as to the backlight to control exposure; and
an exposure value correcting device which corrects the exposure value,
wherein the backlight determining device counts a number of the bright blocks and calculates an exposure value correction amount based on the average luminance level of the bright blocks, the average luminance level of the reference area and the number of the bright blocks, and
if the backlight determining device determines that the picked up image is backlit, the exposure value correcting device corrects the exposure value based on the exposure value correction amount.

2. The image taking device according to claim 1, wherein the backlight determining device samples a block, as a bright block, in which a difference obtained by subtracting the average luminance level in the reference area from the luminance level of the blocks is greater than a predetermined bright block determination EV value.

3. The image taking device according to claims 1, wherein the backlight determining device counts the number of the bright blocks, and
the backlight determining device determines whether the picked up image is backlit based on the average luminance level of the bright blocks and the average luminance level of the reference area if the number of the bright blocks in the image is not less than a predetermined number, and
the backlight determining device determines whether the picked up image is backlit based on the average luminance level in the entire image or in an area except the reference area and the average luminance level of the reference area if the number of the bright blocks is less than the predetermined number.

4. The image taking device according to claim 1, wherein the backlight determining device determines that the picked up image is backlit if a difference obtained by subtracting the average luminance level of the reference area from the average luminance level of the bright blocks is greater than a predetermined backlight determination EV value if the number of the bright blocks in the image is not less than a predetermined number.

5. The image taking device according to claim 1, wherein the backlight determining device determines that the picked up image is backlit if a difference obtained by subtracting the average luminance level of the reference area from the average luminance level in the entire image or in an area of except the reference area is greater than a predetermined backlight determination EV value if the number of the bright blocks is less than a predetermined number.

6. The image taking device according to claim 1, further comprising a flash device which emits a flash at the time of imaging to illuminate an object, wherein
the exposure controlling device obtains an exposure value from the average luminance level of the bright blocks.

7. The image taking device according to claim 1, wherein
the exposure value correcting device calculates an exposure value correction amount based on the number of the bright blocks to correct the exposure value if a difference obtained by subtracting the average luminance level in the reference area from the average luminance level of the bright blocks is greater than a predetermined exposure correction limit value and obtains an exposure value from the average luminance level of the bright blocks if a difference obtained by subtracting the average luminance level in the reference area from the average luminance level of the bright blocks is not greater than the predetermined exposure correction limit value.

8. The image taking device according to claim 1, further comprising:
a flash device which emits a flash at the time of imaging to illuminate an object; and
a diaphragm value calculating device which calculates such a diaphragm value that the flash device illuminates a predetermined range if the backlight determining device determines that the picked up image is backlit, wherein
the exposure controlling device preferentially uses a diaphragm value closer to the open side than the calculated diaphragm value.

9. The image taking device according to claim 8, wherein
the exposure controlling device uses a diaphragm value narrower than the calculated diaphragm value if a shutter speed exceeds the upper value at which the accuracy of a shutter speed can be maintained when a diaphragm value is used which is closer to the open side than the calculated diaphragm value.

10. The image taking device according to claims 8, further comprising an object distance calculating device which calculates a distance to a main object, wherein
the diaphragm value calculating device calculates such a diaphragm value that the flash device illuminates a range reaching the object distance.

11. A method of controlling exposure, comprising the steps of:
picking up an image in a field;
dividing the image into the predetermined number of blocks to measure the luminance level of each block;
calculating an average luminance level in a predetermined reference area in the image;
comparing the average luminance level in the reference area with the luminance level of each block to sample a bright block high in luminance level;
determining whether the picked up image is backlit based on the average luminance level of the bright blocks and the average luminance level of the reference area; and
calculating an exposure value based on the result of the determination as to the backlight to control exposure;
counting a number of the bright blocks; and
calculating an exposure value correction amount based on the average luminance level of the bright blocks, the average luminance level of the reference area and the number of the bright blocks to correct the exposure value if the step of determining whether the picked up image is backlit determines that the picked up image is backlit.

12. The method of controlling exposure according to claim 11, wherein
the step of sampling a bright block samples a block, as a bright block, in which a difference obtained by subtracting the average luminance level in the reference area from the luminance level of the blocks is greater than a predetermined bright block determination EV value.

13. The method of controlling exposure according to claims 11, further comprising the step of counting the number of the bright blocks, wherein
the step of determining whether the picked up image is backlit determines whether the picked up image is backlit based on the average luminance level of the bright blocks and the average luminance level of the reference area if the number of the bright blocks in the image is not less than a predetermined number, and determines whether the picked up image is backlit based on the average luminance level in the entire image or in an area except the reference area and the average luminance level of the reference area if the number of the bright blocks is less than the predetermined number.

14. The method of controlling exposure according to claim 11, wherein
the step of determining whether the picked up image is backlit determines that the picked up image is backlit if a difference obtained by subtracting the average luminance level of the reference area from the average luminance level of the bright blocks is greater than a predetermined backlight determination EV value if the number of the bright blocks in the image is not less than a predetermined number.

15. The method of controlling exposure according to claim 11, wherein
the step of determining whether the picked up image is backlit determines that the picked up image is backlit if a difference obtained by subtracting the average luminance level of the reference area from the average luminance level in the entire image or in an area of except the reference area is greater than a predetermined backlight determination EV value if the number of the bright blocks is less than a predetermined number.

16. The method of controlling exposure according to claim 11, further comprising the step of emitting a flash at the time of imaging to illuminate an object, wherein
the step of controlling exposure obtains an exposure value from the average luminance level of the bright blocks.

17. The method of controlling exposure according to claim 11, wherein
the step of correcting the exposure value calculates an exposure value correction amount based on the number of the bright blocks to correct the exposure value if a difference obtained by subtracting the average luminance level in the reference area from the average luminance level of the bright blocks is greater than a predetermined exposure correction limit value and obtains an exposure value from the average luminance level of the bright blocks if a difference obtained by subtracting the average luminance level in the reference area from the average luminance level of the bright blocks is not greater than the predetermined exposure correction limit value.

18. The method of controlling exposure according to claim 11, further comprising the steps of:
emitting a flash at the time of imaging to illuminate an object; and calculating such a diaphragm value that the step of emitting a flash illuminates a predetermined range if the step of determining whether the picked up image is backlit determines that the picked up image is backlit, wherein the step of controlling exposure preferentially uses a diaphragm value closer to the open side than the calculated diaphragm value.

19. The method of controlling exposure according to claim 18, wherein
the step of controlling exposure uses a diaphragm value narrower than the calculated diaphragm value if a shutter speed exceeds the upper value at which the accuracy of a shutter speed can be maintained when a diaphragm value is used which is closer to the open side than the calculated diaphragm value.

20. The method of controlling exposure according to claim 18, further comprising the step of calculating distance to a main object, wherein
the step of calculating a diaphragm value calculates such a diaphragm value that the step of emitting a flash illuminates a range reaching the object distance.

* * * * *